Nov. 28, 1967  J. R. MITCHELL  3,355,128
HARNESS
Filed May 19, 1966                                  2 Sheets-Sheet 1
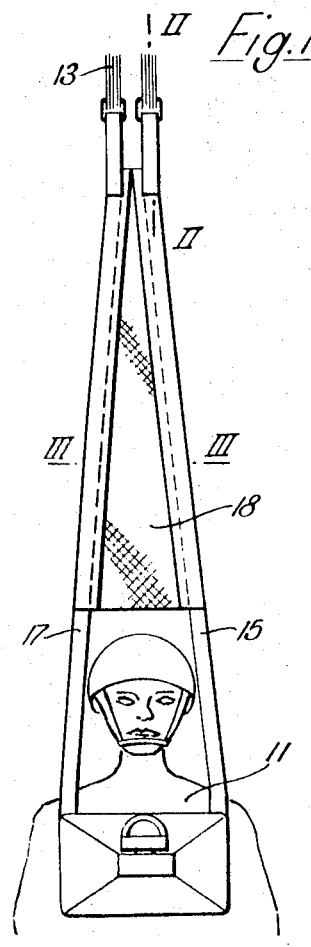
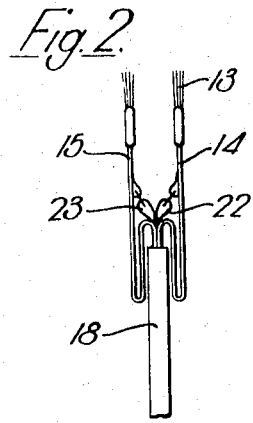
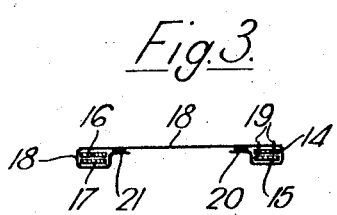
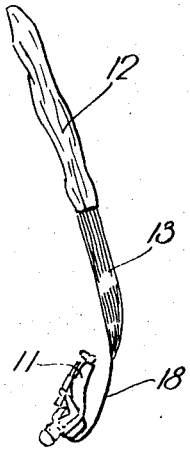
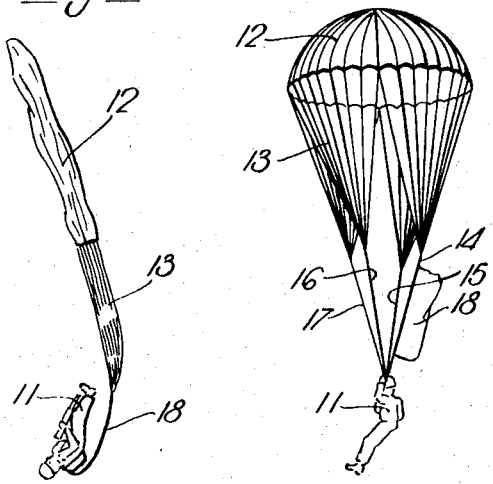
Inventor
John Rothwell Mitchell
By Shoemaker and Mattare
Attorneys Nov. 28, 1967     J. R. MITCHELL     3,355,128
HARNESS
Filed May 19, 1966     2 Sheets-Sheet 2
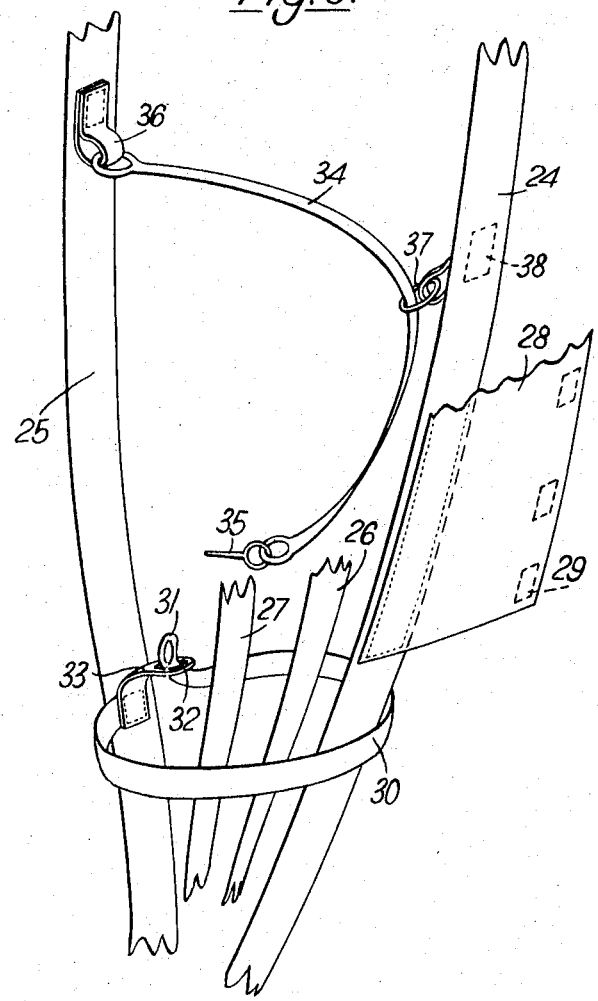
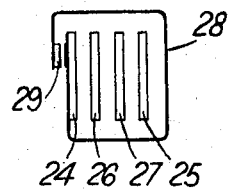
Inventor
John Rothwell Mitchell
By
Shoemaker and Mattare
Attorneys

United States Patent Office 3,355,128
Patented Nov. 28, 1967

3,355,128
HARNESS
John Rothwell Mitchell, Woking, England, assignor to G. Q. Parachute Company Limited, Woking, England, a British company
Filed May 19, 1966, Ser. No. 551,284
Claims priority, application Great Britain, July 9, 1965, 30,068/65
4 Claims. (Cl. 244—151)

ABSTRACT OF THE DISCLOSURE

The pairs of riser webs extending from parachute harness are detachably held in face contacting relation by elongated apron which is permanently attached to one of the webs longitudinally thereof, and then wrapped about the webs and secured to itself in a pull-apart connection.

---

This invention relates to harness and particularly to harness for connecting a load, such as a parachutist, to rigging lines connecting the load to the canopy of a parachute.

When a parachutist leaves an aircraft which is travelling at high speed, he has less control of his attitude than when the aircraft is travelling relatively slowly. He may tumble, and may entangle the risers of his harness or the rigging lines of his parachute so that the canopy does not open properly.

The object of this invention is to enable a parachutist to bypass the risers of his harness if he should tumble against them.

The invention ensures that if a parachutist leaves an aircraft with his head downwards, his legs and feet will not pass between the risers of his harness and so twist the rigging lines of his parachute.

According to the invention, a harness for connecting a load, such as a parachutist, to a parachute is provided with risers for connecting the harness to the rigging lines of the parachute and means for connecting the risers and/or the rigging lines together which means break or part when a predetermined strain is exerted on the said means to allow the risers to separate.

The invention also comprises a harness for connecting a parachutist with the rigging lines of a parachute in which the harness is provided with risers connecting with the said rigging lines and means are provided for holding the said risers together until the canopy of the parachute is deployed.

The invention is hereinafter described with reference to the accompanying drawings of which FIGURE 1 shows a parachutist wearing a parachute harness according to the invention, FIGURES 2 and 3 are sections through the risers of the harness of FIGURE 1 taken on lines II—II and III—III respectively, FIGURE 4 shows the parachutist falling from an aircraft wearing a harness according to the invention before the parachute canopy has deployed, FIGURE 5 shows the same parachutist after the parachute canopy is fully deployed, and FIGURES 6 and 7 show another method of holding the risers according to the invention.

In FIGURE 1, the parachutist 11 is connected to the canopy 12 of the parachute by rigging lines 13 and risers or riser webs 14, 15, 16 and 17.

An apron 18 is attached to riser 14 by stitches 19. The apron 18 is preferably made of net or similar material having little drag and a mesh which is small enough to prevent the feet of the parachutist, or projections from his boots or equipment, becoming entangled with the mesh. The apron is shaped so that it can be passed around the four risers as shown in the figures and is held in position around the risers by fasteners 20, 21, which are conveniently touch fasteners, but any suitable form of fastening can be used so long as the fastening pulls apart as soon as a predetermined load is experienced on the risers.

The risers are also held together in pairs by break ties 22, 23 shown in FIGURE 2. These break ties are shown between risers 14 and 15 but similar break ties are also provided between risers 16 and 17. The break ties are of such strength that they will break when the canopy has deployed and is supporting the parachutist.

When the parachutist leaves the aircraft the canopy begins to deploy as shown in FIGURE 4. The parachutist might twist or somersault before the canopy deploys, but as the risers are held together by the break ties 22, 23 and are enclosed by the apron 18 the legs of the parachutist cannot pass between the risers and so cannot twist the rigging lines to prevent the canopy opening correctly.

When the canopy has opened sufficiently to arrest the free fall of the parachutist, the break ties 22, 23 break and the risers 14, 15, 16 and 17 tend to be dragged apart by the pull on the rigging lines. This pull is sufficient to break open the fastenings 20, 21 which are holding the apron around the risers. The fastenings open, the apron remains attached to riser 14, and the parachutist is now supported by the fully deployed canopy as shown in FIGURE 5.

The invention is described above using an apron, but the use of the apron is not essential. If an apron is not used, it is desirable that additional break ties be provided between the risers 14 and 16 and the risers 16 and 18 to keep the risers together until the canopy 12 has fully deployed.

A flap carrying touch tape pads can be provided to cover the break ties shown in FIGURE 2 to prevent accidental operation, the flap being attached by stitching to one of the risers and being just long enough to encompass the two risers.

Instead of using an apron as shown in FIGURES 1 to 5, to contain the risers, the risers can be stacked together. Such an arrangement is shown in FIGURES 6 and 7 where the risers or riser webs 24, 25, 26 and 27 are stacked and encircled by an apron 28.

The flap 28 is attached to one of the rear risers 24 by stitching or by other suitable means and carries pads 29 of touch tape. The other rear riser 25 carries a control web 30 which ends in a loop 31 and a short strap 33 which has a loop 32 through which the control web 30 can be passed. The control web 30 and the strap 33 are joined to the riser at a point which would be just above the parachutists head when the parachute is deployed and is just below the area covered by the apron 28 when that is passed round the risers. The riser 25 also carries, at a point above the area covered by the apron 28 a patch 36 to which a strap 34 is attached. The strap 34 carries a pin 35. The riser 24 also carries a patch 38 above the apron 28 which holds a ring 37.

In this embodiment, the risers are stacked with the forward risers between the rear risers, the strap 34 is passed through the ring 37 carried by patch 38 on riser 24 and passes through the loop 31 on the control web 30 after the web has been passed around the stacked risers and the end of the web has been passed through the loop 32 on strap 33. The apron is then wrapped around the stacked risers and the touch tape patches 29 are pressed together to hold the apron in position.

When the parachute canopy has deployed, the rear risers 24 and 25 tend to be dragged apart and the touch tape pads 29 burst apart to allow the apron 28 to fall away from the stacked risers. As the rear risers 24, 25 draw further apart, the pin 35 is pulled from the loop 31 and the end of the control web 30 is freed so that it is drawn through the loop 32 in strap 33 so that the risers assume their normal positions.

The release device described can be replaced by a breaking tie and the apron 28 need not be provided. It could be omitted altogether or could be replaced by touch tape patches on the lower parts of risers 24, 25, 26, 27 so that the risers can be stacked by pressing the risers together.

It is preferred to fit the apron and control web fittings to the rear risers to leave the forward risers free of encumbrances as these forward risers are used to control the parachute maneuvres.

The means holding the risers together should preferably be of sufficient strength to hold when the pull is exerted from one shoulder only of the parachutist, but to break when the main canopy has inflated. This ensures that if the parachutist tumbles sideways and one shoulder is lower than the other the canopy will not be distorted.

The invention could be used with harness for inanimate loads to prevent the loads becoming mixed with the rigging lines of the associated parachutes.

The invention is not restricted to the means being on the risers. It could for example be on the rigging lines of the parachute or part of the means might be on the rigging lines and only part on the risers.

The invention is not restricted to the particular embodiments described above, for example the break ties or touch fasteners could be replaced by press fasteners and other modifications could be made without departing from the invention.

What is claimed is:
1. In a parachute harness for use with a parachute having rigging lines, spaced pairs of riser webs connecting said harness to the rigging lines, readily detachable means for connecting the riser webs of each pair together in face contacting, non-folded relation longitudinally thereof, said means comprising an elongated apron fixedly secured to one riser web longitudinally thereof, and detachably secured about said riser webs in a pull-apart connection, said connection holding said riser webs together until the canopy of the parachute is substantially fully deployed.

2. The combination of claim 1, in which said apron spans the distance between said pairs of riser webs and each longitudinal edge thereof is detachably secured about a pair of riser webs.

3. The combination of claim 2, in which said apron is longitudinally tapered toward the rigging lines.

4. The combination of claim 1, in which the apron is rectangular in shape and wrapped about both pairs of riser webs and secured in position by a single pull-apart connection.

References Cited
UNITED STATES PATENTS
| | | | |
|---|---|---|---|
| 2,336,312 | 12/1943 | Strong | 244—151 |
| 2,462,234 | 2/1949 | Supina | 244—151 |

FERGUS S. MIDDLETON, *Primary Examiner.*

MILTON BUCHLER, *Examiner.*

R. A. DORNON, *Assistant Examiner.*